Figures 1, 2, 3:
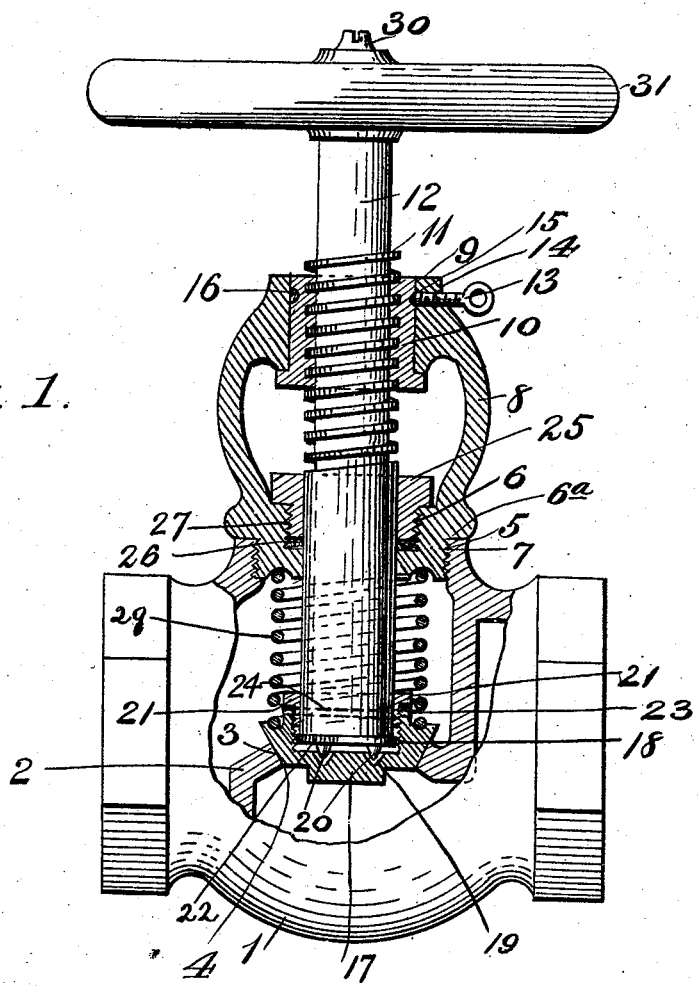

No. 857,321. PATENTED JUNE 18, 1907.
T. WALTZ.
GLOBE, ANGLE, AND CHECK VALVE.
APPLICATION FILED APR. 6, 1904.

Witnesses
F. L. Ourand
W. A. Ourand

Inventor
Thomas Waltz,
By John A. Saul
Attorney

UNITED STATES PATENT OFFICE.

THOMAS WALTZ, OF NEWTON, ILLINOIS.

GLOBE, ANGLE, AND CHECK VALVE.

No. 857,321.  Specification of Letters Patent.  Patented June 18, 1907.

Application filed April 6, 1904. Serial No. 201,908.

*To all whom it may concern:*

Be it known that I, THOMAS WALTZ, a citizen of the United States, residing at Newton, in the county of Jasper and State of Illinois, have invented certain new and useful Improvements in Globe, Angle, and Check Valves, of which the following is a specification.

My invention relates to an improvement in combined globe, angle, and check-valves; and more particularly to that class of valves having means whereby the disks may be be ground to their seats without removing them from the valves.

The invention is an improvement on Patent 628999, granted July 18, 1899, to Waltz and Bell.

The object of the invention is therefore to regrind the disk and seat of a valve, removing any foreign substance that may lodge between the disk and valve seat.

In the drawings forming a part of this invention, and in which like symbols of reference represent corresponding parts in the several views, Figure 1 is a cross-sectional view of the valve in position for regrinding; Fig. 2 is a plan view of the disk, showing the interior of the same; and, Fig. 3 a view of the end of the valve rod.

1 represents the valve stock or body of the valve; 2 the diaphragm in the same; 3 the valve seat; and 4 the opening for the passage of the fluid.

5 is a valve cap having internally-threaded opening 6, for reception of stuffing box, and external screw-threads 6ª, that take into the internally-threaded portion 7 in the valve stock, said valve cap having a yoke 8, and a circular opening 9 in its top.

10 is a sleeve internally threaded to engage screw 11 on valve rod 12, and 13 a set-screw working in the internally-threaded opening 14 in side of yoke 8, and engaging the recess 15 in sleeve 10. Sleeve 10 also has a peripheral groove 16 in line with recess 15.

17 is a disk having an internal screw-thread 18, and recesses 19, the latter adapted to receive pins on lugs 20 on the end of valve rod 12, the object of the same being to lock the parts when the same are screwed together by screw-nut 21; and 22 is a flange on valve rod 12, against which nut 21 contacts when the valve rod is raised. The screw-nut 21, as will be observed, is constructed to hold the disk to the valve rod loose enough to permit said valve to adjust itself to its seat; but not loose enough to permit the valve to turn on the valve rod.

23 are perforations in the disk and nut, and 24 a perforation through end of valve rod, the object of the same being to receive screws, or the like, to lock the parts, when desired.

25 is a stuffing-box, and 26 a packing ring upon which the same operates, said stuffing-box having external threads 27 engaging the internally-threaded opening 6 in the cap 5.

29 is a spring adapted to overcome the friction of the packing ring, and hold the valve normally on its seat.

30 is a screw engaging the internally-threaded opening in the top of valve rod 12 to hold the hand wheel 31 on same.

The lugs 20 are secured in place by a small collar 32 driven into the perforation or socket 33 in end of valve rod; but any other means may be employed for the purpose.

The operation of the device is as follows:— The set screw 13 may be released sufficiently to leave the end of the same only sufficient play to engage the peripheral groove 16, and permit rotary movement of sleeve 10; or it may be, when desired, completely unscrewed, in which case the sleeve 10 slides freely within the opening 9, being carried by valve rod 12, and the valve be ground upon its seat. In this case the valve is held to its seat by spring 29, which overcomes friction of packing ring. When desired, the sleeve 10 is secured to its place by set-screw 13, the hand wheel 31 operated, and the disk 17 locked upon the seat. In this case it acts as a globe valve. When the sleeve 10 is released, and the rod 12 sufficiently unscrewed against the power of spring 29 to permit play of the valve rod, it acts as a check valve.

Having now fully described my invention, what I claim as new and desire to secure by Letters-Patent, is:—

1. In a valve, a valve rod having a flange at its valve end, pins on the valve rod, a disk having recesses to register with the pins on the valve rod, an internal screw-thread in the disk, a nut on the valve rod adapted to engage the internal thread of the disk, and a spring above the nut adapted to hold the valve normally to its seat.

2. In a valve, a main stock having a threaded opening, a yoke-shaped cap having an external thread to screw into the opening, a stuffing box in the cap, a threaded valve rod, an internally-threaded sleeve adapted to engage the threads upon the valve rod, a collar at the top of the yoke to receive the sleeve, a set screw for locking the sleeve to the yoke, a disk, means for locking the disk to the valve rod, and a spring to normally hold the valve to its seat.

3. In a device of the character described, a valve rod having a socket formed in its end, pins adapted to be received in said socket, and a collar to secure the pins in the socket.

In testimony whereof I affix my signature in presence of two witnesses.

THOMAS WALTZ.

Witnesses:
J. D. TRAMHART,
J. C. McCULLOUGH.